(12) United States Patent
Kalapodis et al.

(10) Patent No.: US 6,294,977 B1
(45) Date of Patent: Sep. 25, 2001

(54) THERMAL SWITCH ASSEMBLY

(75) Inventors: James B. Kalapodis, Akron; William F. Quinn, Greenwich, both of OH (US)

(73) Assignee: Therm-O-Disc, Incorporated, Mansfield, OH (US)

( * ) Notice: Subject to any disclaimer, the term of this patent is extended or adjusted under 35 U.S.C. 154(b) by 0 days.

(21) Appl. No.: 09/553,805

(22) Filed: Apr. 21, 2000

Related U.S. Application Data

(63) Continuation of application No. 08/850,082, filed on May 2, 1997, now Pat. No. 6,069,551.

(51) Int. Cl.$^7$ .......................... H01H 61/06; H01H 32/50; H01H 37/46; H01M 2/00

(52) U.S. Cl. .......................... 337/140; 337/139; 337/395; 337/396; 429/61; 429/122

(58) Field of Search ............................ 337/333, 140, 337/362, 365, 380, 372, 381, 382, 393, 112, 765, 14; 429/61, 62, 57, 66, 58, 54, 71, 122, 124

(56) References Cited

U.S. PATENT DOCUMENTS

| | | |
|---|---|---|
| 2,497,397 | 2/1950 | Dales . |
| 2,743,335 | 4/1956 | Moyer . |
| 3,213,250 | 10/1965 | Marcoux . |
| 3,474,372 | 10/1969 | Davenport et al. . |
| 3,707,694 | 12/1972 | DuRocher . |
| 3,801,944 | 4/1974 | Brown . |
| 4,035,552 | 7/1977 | Epstein . |
| 4,188,460 | 2/1980 | Kang et al. . |
| 4,356,478 | 10/1982 | Muggli et al. . |
| 4,374,311 | 2/1983 | Okahashi et al. . |
| 4,395,694 | 7/1983 | Wehl . |
| 4,503,131 | 3/1985 | Baudrand . |
| 4,774,151 | 9/1988 | Cuomo et al. . |
| 4,782,318 | 11/1988 | Boulanger . |
| 4,818,641 | 4/1989 | Ledenican . |
| 4,821,010 | 4/1989 | Plasko . |
| 4,855,195 | 8/1989 | Georgopoulos et al. . |
| 4,973,936 | 11/1990 | Dimpault-Darcy et al. . |
| 4,975,341 | 12/1990 | Tucholski et al. . |
| 4,992,339 | 2/1991 | Georgopoulos . |
| 5,026,615 | 6/1991 | Tucholski . |
| 5,061,914 | 10/1991 | Busch et al. . |
| 5,188,909 | 2/1993 | Pedicini . |
| 5,206,622 | 4/1993 | Lattari . |
| 5,268,664 | 12/1993 | Givler . |
| 5,337,036 | 8/1994 | Kuczynski . |

(List continued on next page.)

FOREIGN PATENT DOCUMENTS

| | | |
|---|---|---|
| 0 689 255 A3 | 3/1996 | (EP) . |
| 0 700 109 A1 | 3/1996 | (EP) . |
| 0 757 394 A1 | 2/1997 | (EP) . |
| 0 773 595 A1 | 5/1997 | (EP) . |
| 63 175 345 | 7/1984 | (JP) . |
| 59 191 273 | 10/1984 | (JP) . |
| 59 203 376 | 11/1984 | (JP) . |
| 04 345 724 | 12/1992 | (JP) . |
| 0 689 255 A2 | 5/1995 | (JP) . |
| 08 185 849 | 7/1996 | (JP) . |
| 08 236 102 | 9/1996 | (JP) . |

*Primary Examiner*—Gerald Tolin
*Assistant Examiner*—Anatoly Vortman
(74) *Attorney, Agent, or Firm*—Harness, Dickey & Pierce, P.L.C.

(57) ABSTRACT

A thermal switch assembly has a contact member of shape memory alloy sandwiched between a pair of electrically conductive outer members. A contact arm on the contact member has a deformed shape at normal temperatures and a recovered shape at elevated temperatures. The contact arm occupies two different positions in its deformed and recovered shapes, and provides a current path between the outer members in one position while interrupting the current path in the other position.

18 Claims, 3 Drawing Sheets

U.S. PATENT DOCUMENTS

| | | |
|---|---|---|
| 5,376,467 | 12/1994 | Abe et al. . |
| 5,567,539 | 10/1996 | Takahashi et al. . |
| 5,619,177 | 4/1997 | Johnson et al. . |
| 5,691,073 | 11/1997 | Vu et al. . |
| 5,747,187 | 5/1998 | Byon . |
| 5,750,277 | 5/1998 | Vu et al. . |
| 5,766,790 | 6/1998 | Kameishi et al. . |
| 5,766,793 | 6/1998 | Kameishi et al. . |
| 5,825,275 | 10/1998 | Wuttig et al. . |
| 5,844,464 | 12/1998 | Kalapodis et al. . |
| 5,879,832 | 3/1999 | Vu et al. . |

THERMAL SWITCH ASSEMBLY

This is a continuation of U.S. patent application Ser. No. 08/850,082, filed May 2,1997, now U.S. Pat. No. 6,069,551.

BACKGROUND OF THE INVENTION

This application relates to the art of thermal switches and, more particularly, to thermal switches that use a contact member of temperature sensitive shape memory alloy for making and breaking a circuit. The thermal switch of the present invention is particularly applicable for use in batteries and will be described with specific reference thereto. However, it will be appreciated that the invention has broader aspects and can be used in other devices.

Shape memory alloys can be used to replace bimetals in thermal switches. A switch contact arm of shape memory alloy has a deformed shape at normal temperatures and changes to a recovered shape at elevated temperatures. These changes in shape of a shape memory alloy contact arm provide different contact arm positions that can be used to open and close an electrical circuit.

Electrical switch components of shape memory alloy have been incorporated in batteries to open the battery circuit when the battery overheats. It is difficult to incorporate a switch component of shape metal alloy into the battery construction in a manner that provides reliable operation and protects the shape memory alloy from the corrosive battery environment. Therefore, it would be desirable to have a self-contained unitary sealed thermal switch assembly that can be incorporated into batteries and other devices in a convenient and reliable manner.

SUMMARY OF THE INVENTION

A self-contained sealed thermal switch assembly includes a contact member of shape memory alloy sandwiched between a pair of electrically conductive metal outer members. The contact member has a contact arm that completes or opens a current path between the pair of outer members by changing between a deformed shape at normal temperatures and a recovered shape at elevated temperatures.

In a preferred arrangement, the contact member of shape memory alloy is substantially E-shaped in plan view, and the elongated contact arm is defined by the center leg of the E.

In accordance with a preferred arrangement, the peripheral portion of the contact member is circumferentially interrupted so that its circumferential extent is substantially less than 360° but at least 270°.

An electrical insulator is positioned between a peripheral portion of the contact member and one of the outer members. The contact arm engages the one outer member when it is in its deformed shape at normal temperatures, and moves out of engagement with the one outer member when it is in its recovered shape at an elevated temperature.

The pair of outer members have a cavity therebetween in which the elongated contact arm is located, and the one outer member has a depression therein facing the cavity.

The outer members have outwardly extending circumferential flanges surrounded by a sealing ring of electrical insulating material. A metal clamping ring surrounds the sealing ring and is crimped over the flanges on the outer members for holding same together while firmly compressing the sealing ring against the flanges to seal the cavity.

In a preferred arrangement, the pair of outer members include a cap member and a base member. The base member is of aluminum and the cap member is of cold rolled steel that is plated with a precious metal.

The contact member of shape memory alloy preferably is plated with a precious metal.

It is a principal object of the present invention to provide a self-contained sealed thermal switch assembly that has a contact member of shape memory alloy.

It is also an object of the invention to provide a unitary thermal switch assembly that can be installed in batteries and other devices.

It is also an object of the invention to provide a thermal switch assembly of the type described that is reliable in operation and relatively easy to manufacture and assemble.

DESCRIPTION OF A PREFERRED EMBODIMENT

Figure 1:
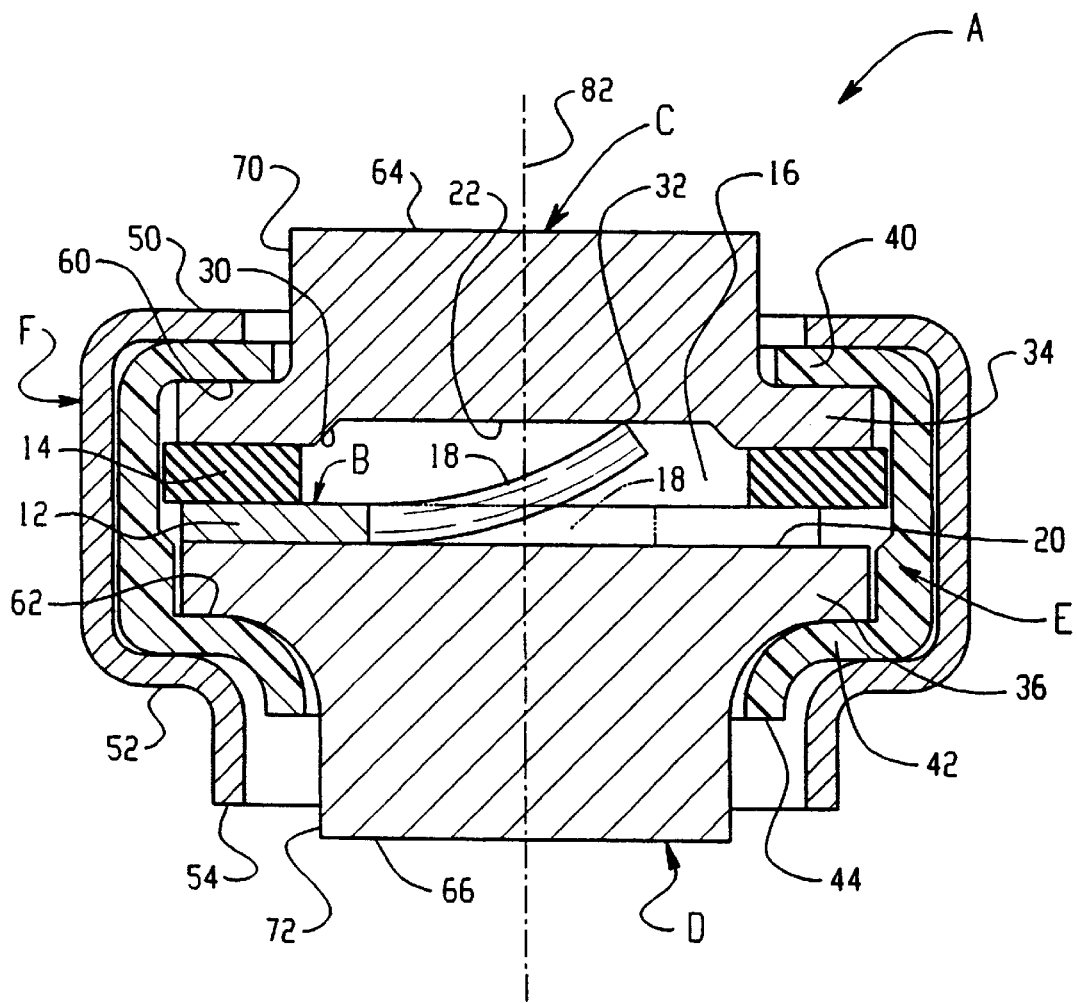
FIG. 1 is a cross-sectional elevational view of a self-contained sealed thermal switch assembly constructed in accordance with the present application.

Referring now to the drawing, wherein the showings are for purposes of illustrating a preferred embodiment of the invention only and not for purposes of limiting same, FIG. 1 shows a self-contained sealed thermal switch assembly A constructed in accordance with the present application.

A contact member B of shape memory alloy has a peripheral portion 12 thereof sandwiched between a pair of electrically conductive outer members C and D that respectively are identified as cap and base members. A dielectric gasket ring 14 is positioned between cap member C and peripheral portion 12 of contact member B. Ring 14 preferably is a relatively hard material such as a liquid crystal polymer, although it will be appreciated that other materials can be used.

A central cavity 16 between outer members C and D receives an elongated contact arm 18 extending inwardly from outer peripheral portion 12 of contact member B. Base outer member D has a substantially flat or plane inner surface 20 facing cavity 16. Cap outer member C also has a substantially flat or plane inner surface 22 facing cavity 16. Inner surface 22 also defines the bottom of a cavity or depression 30 in cap member C that enlarges the vertical extent of cavity 16. Contact arm 18 has a terminal end 32 engaging inner surface 22 on cap member C to provide an electric current path between outer members C and D.

Outer members C and D have outwardly extending circumferential flanges 34 and 36 thereon to provide clamping surfaces for cooperation with a clamping ring, and are surrounded by a sealing ring E of electrical insulating material. Ring E preferably is of a relatively soft material that will deform and flow under load to provide a good seal. Polypropylene is one example of a material that can be used, although it will be appreciated that many other materials also would be satisfactory. Sealing ring E has inwardly extending upper and lower circumferential projections 40 and 42 that overlie flanges 34 and 36. Lower projection 42 extends inwardly and downwardly to terminate in a cylindrical portion 44.

A metal clamping ring F surrounds sealing ring E and has inwardly extending circumferential extensions 50 and 52 that respectively overlie outer surfaces of circumferential sealing projection 40 and flange 34, and circumferential sealing projection 42 and flange 36. Clamping ring extension 52 extends inwardly and downwardly to terminate in a cylindrical clamping ring portion 54.

Clamping ring F is crimped, along with its extensions 50 and 52, to compress sealing projections 40 and 42 against flanges 34 and 36 for providing a good seal between the surfaces generally indicated at 60 and 62. Insulating ring 14 and peripheral portion 12 of contact member B are held under compression by crimp ring F. Insulating ring 14 has a larger diameter than the outer periphery of contact member B, and of flanges 34 and 36. The outer periphery of ring 14 will engage sealing member E to prevent sliding movement of ring 14 relative to contact member B, and thereby prevent ring 14 from interfering with movement of switch arm 18.

Outer members C and D have substantially flat circular outer end surfaces 64 and 66 that are located axially outwardly from clamping ring F. Outer members C and D have cylindrical outer end portions 70 and 72, and cylindrical outer end portion 72 on base outer member D has a slightly smaller diameter than cylindrical outer end portion 70 on cap outer member C. Strictly by way of example and not by way of limitation, the diameter of cylindrical outer end portion 72 on base outer member D may be about 15–25 percent smaller than the diameter of cylindrical outer end portion 70 on cap outer member C.

Contact member B preferably is of a nickel-titanium shape memory alloy. However, it will be appreciated that other shape memory alloys can be used such as copper-based ternaries including copper-zinc-aluminum and copper-nickel-aluminum. The transition temperature range at which the alloy changes from its deformed shape to its recovered shape also can be varied significantly by selecting different shape memory alloy compositions and by varying heat treating processes.

Figure 2:
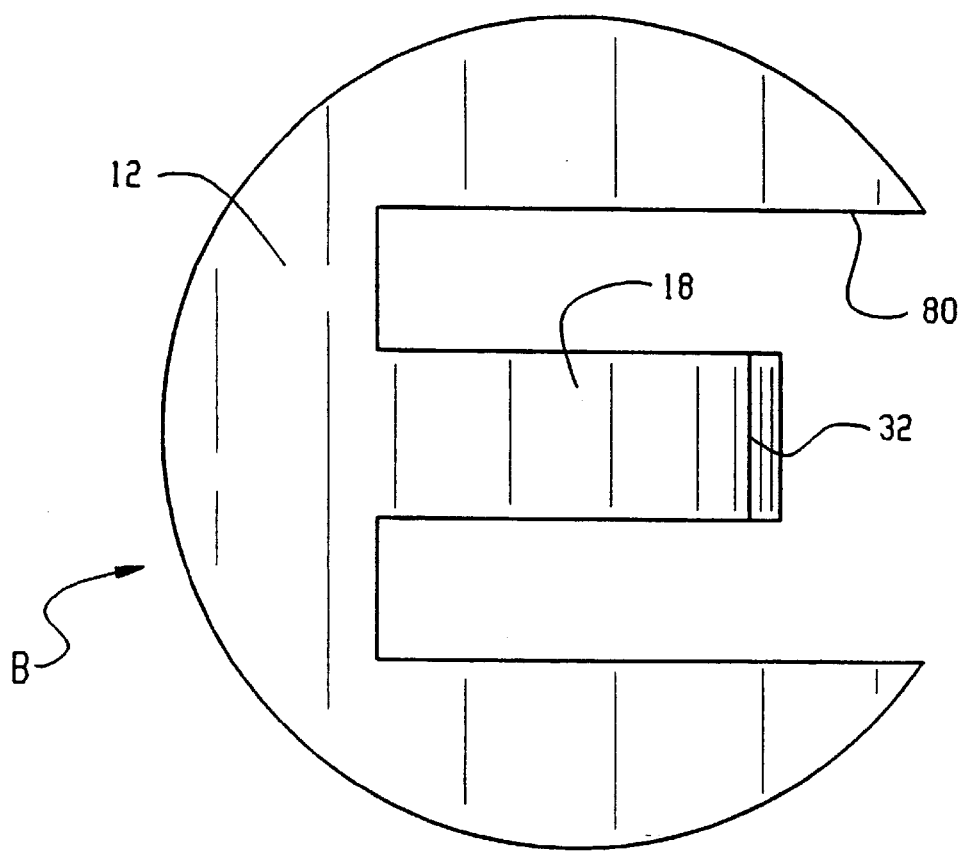
FIG. 2 is a plan view of a contact member used in switch assembly of FIG. 1.
Figure 3:
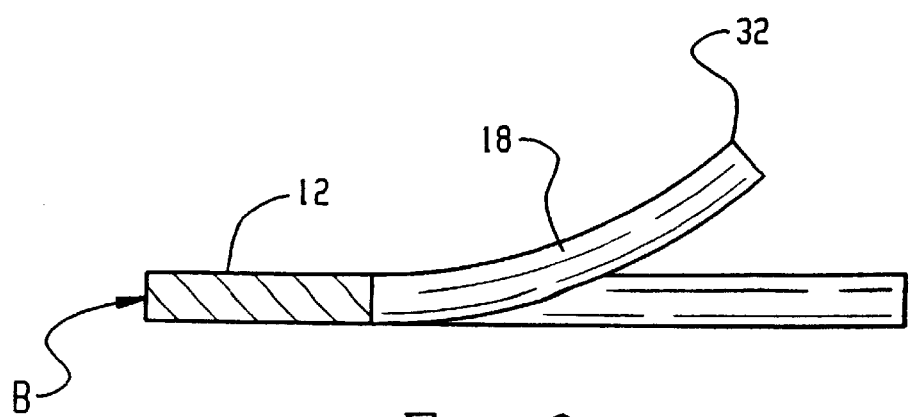
FIG. 3 is a side elevational view of the contact member of FIG. 2.

Contact member B is stamped and cut to its flat E-shaped configuration shown in FIG. 2, and is then heated to its austenitic transformation temperature. The contact member is then cooled to the martensitic state of the alloy, and contact arm 18 is bent to a deformed shape having a desired configuration and position. This deformed shape is the one shown in FIG. 1, and the relaxed deformed shape of contact arm 18 would have it extend above inner facing surface 22. Thus, contact arm 18 is placed in bending stress when outer members C and D are clamped together so that terminal end 32 of contact arm 18 makes firm engagement with inner facing surface 22. In other words, the relaxed deformed position of contact arm 18 occupies a greater vertical distance than the distance between facing surfaces 20 and 22.

When the switch assembly is subjected to a transformation temperature at which martensite changes to austenite, switch arm 18 reverts to its recovered shape shown generally in shadow line in FIG. 1 with two-way contact material. Upon cooling, contact arm 18 will revert to its solid line deformed shape reestablishing electrical continuity between outer members C and D. With one-way contact material the contact arm remains in the recovered shape upon cooling.

Shape memory alloys may be selected to have a large range of transformation or transition temperatures. The alloy selected is one that has a transition temperature approximating that of the over temperature condition to be protected against. For use in batteries, examples of transformation temperatures of alloys that have been tested, plus or minus 5°, include 62° C., 73° C. and 82° C. These example would have transformation temperature ranges of approximately 57–67° C., 58–78° C. and 77–87° C. It will be recognized that a wide range of alloys and transformation temperatures may be chosen depending upon the application for the thermal switch assembly.

In the battery application, the switch is normally closed and opens at an elevated or transformation temperature. It will be recognized that it is possible to arrange the thermal switch assembly for use in fire alarms or the like so that a circuit would be made instead of broken upon subjecting the switch assembly to an elevated transformation temperature. The contact member then would provide an open circuit in its deformed shape and a complete circuit in its recovered shape.

FIG. 2 shows contact member B as being substantially E-shaped in plan view. Elongated contact arm 18 is the center leg of the E and is shorter than the outer legs. Outer peripheral portion 12 of contact member B is circumferentially interrupted opposite terminal end portion 32 of contact arm 18. The circumferential interruption is generally indicated at 80 and is shown extending over an arc of about 60°. The circumferential interruption may be in the range of 30–90° so that circular peripheral portion 12 extends substantially less than 360° but at least 270°. This physical characteristic facilitates stamping and forming of contact member B, and provides reliable operation after assembly.

With reference to FIG. 1, contact arm 18 extends substantially radially of central longitudinal axis 82 of switch assembly A. Contact arm 18 intersects and extends through axis 82. Contact arm 18 extends in one radial direction toward terminal end portion 32 from axis 82 and extends in an opposite radial direction from axis 82 toward its connection with peripheral portion 12. That portion of contact arm 18 that extends from axis 82 to terminal end portion 32 is longer than that portion of contact arm 18 that extends from axis 82 to the connection with peripheral portion 12.

When contact arm 18 is said to have a deformed shape and a recovered shape, it does not necessarily mean that the contact arm is deformed as shown in FIG. 1. For example, contact arm 18 could be bent upwardly before contact member B is heated to its austenite transformation temperature and bent back down into the plane of peripheral portion 12 after cooling. In such an arrangement, the upwardly curved position shown for contact arm 18 in FIG. 1 would be the recovered shape and a position lying substantially flat in the plane of peripheral portion 12 would be the deformed shape. The deformed shape simply is the shape assumed by the alloy in its martensitic state, and the recovered shape is the shape assumed by the alloy in its austenitic state.

Figure 4:
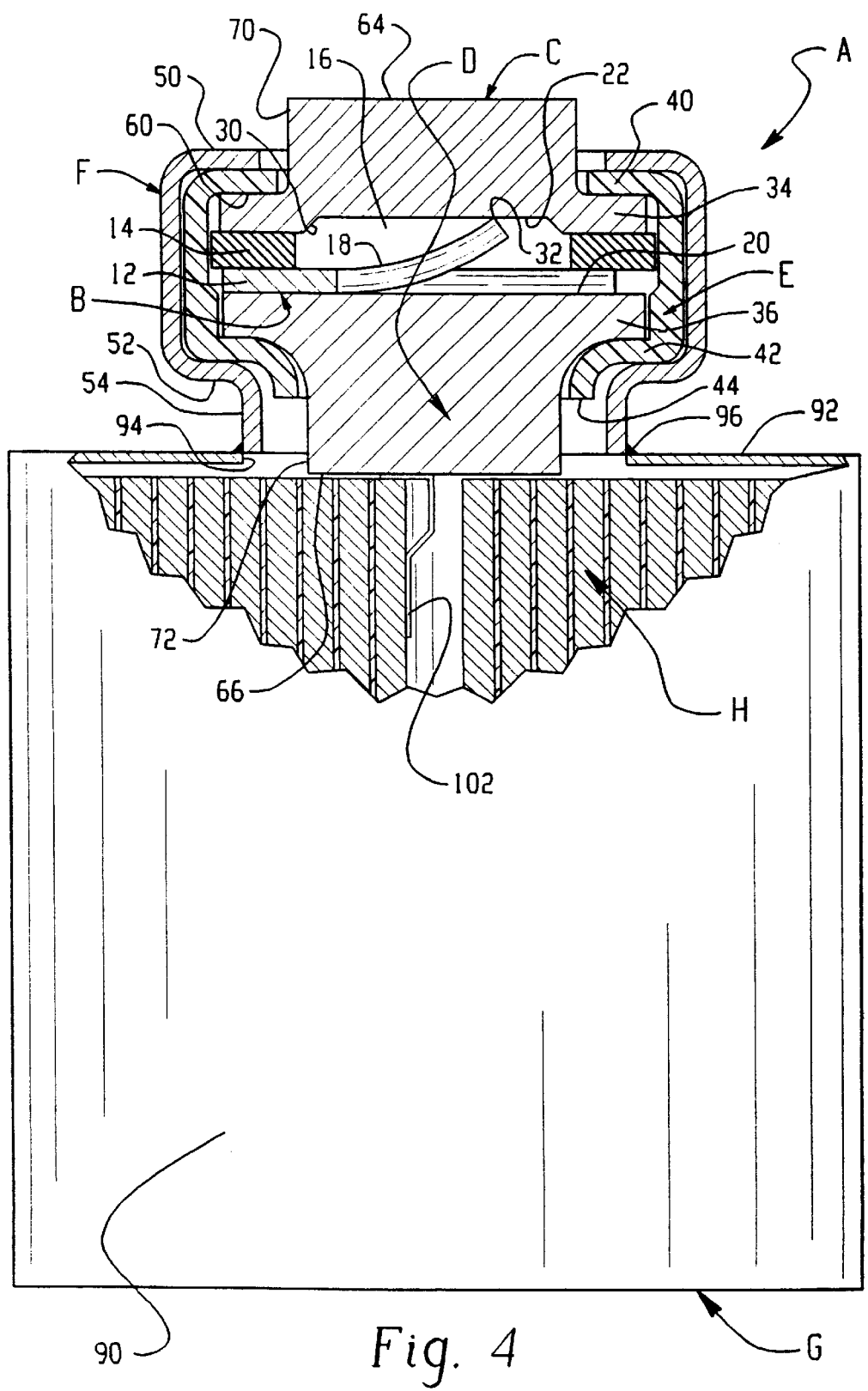
FIG. 4 is a side elevational view of a battery having the switch assembly installed thereon, and with portions cutaway and in section for clarity of illustration.

FIG. 4 shows a battery G having an aluminum case 90 and an aluminum lid 92 welded thereto. A cylindrical hole 94 in lid 92 has a diameter approximately the same as the outer diameter of cylindrical end portion 54 on clamping ring F. Lid 92 and switch assembly A are held in fixtures with the terminal end surface of clamping ring cylindrical portion, 54 substantially flush with the outer surface of lid 92 in the position shown in FIG. 4. A laser weld generally indicated at 96 is then applied around the entire circumference of clamping ring cylindrical portion 54 for welding same to lid 92. A wire 102 is welded to end surface 66 of base outer member D. The assembled lid and switch assembly are then positioned as shown in FIG. 4 on battery case 90. Lid 92 is then peripherally laser welded to case 90 wire 102 projecting down into a wrapped multi-layer assembly H that forms the battery electrodes.

The switch assembly of the present application is particularly advantageous for use with lithium ion electrochemical cells. One example of such a cell is described in U.S. Pat. No. 3,939,011, the disclosure of which is hereby incorporated herein by reference. Obviously, the improvements of the present application can be used in other types of lithium ion batteries as well as in other non-lithium batteries. A battery may overheat and present a danger of explosion when it is subjected to extremely rapid charging or discharging over prolonged periods of time or by reversing polarity when recharging. The improved thermal switch assembly of the present application interrupts charging or discharging when the battery reaches an elevated temperature to minimize the possibility of an explosion.

Clamping ring F preferably is nickel plated steel. Base outer member D is aluminum to better withstand a corrosive environment of the battery interior. Contact member B preferably is plated with a precious metal such as silver or gold. Cap outer member C is of cold rolled steel and its entire surface, especially outer end 64 and inner surface 22, is plated with a precious metal such as silver or gold. It will be recognized that other metals and plating metals can be used depending upon the application for the thermal switch assembly. For some applications, plating can be omitted.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

We claim:

1. A thermal switch assembly comprising:
   a current-carrying actuator made from a shape memory alloy, said actuator being generally E-shaped in plan view and comprising a plurality of legs, at least one of said plurality of legs comprising a peripheral portion and at least another of said plurality of legs comprising a contact portion;
   first and second conductive members oriented in a spaced-apart relationship;
   said peripheral portion of said actuator being electrically isolated from one of said first and second conductive members;
   said actuator having a deformed shape below a transformation temperature range wherein said contact portion is electrically isolated from the other of said first and second conductive members; and
   said actuator having a recovered shape above said transformation temperature range wherein said contact portion is electrically contacting the other of said first and second conductive members.

2. The switch assembly of claim 1 wherein said first and second conductive members have a central axis and said contact portion of said actuator intersects said axis.

3. The switch assembly of claim 2 wherein said contact portion extends through said axis and contact portion comprises a free end portion located in one direction from said axis and said contact portion is connected with said peripheral portion in an opposite direction from said axis.

4. The switch assembly of claim 1 wherein said conductive members have substantially planar inner facing surfaces.

5. The switch assembly of claim 1 further comprising an insulator interposed between said peripheral portion of said actuator and one of said first and second conductive members.

6. The switch assembly of claim 1 further comprising a battery having a terminal that is defined by said switch assembly, said switch assembly being installed on said battery, and wherein said switch assembly provides a current path to or from said battery.

7. The switch assembly of claim 1 wherein at least one of said conductive members is made of aluminum.

8. The switch assembly of claim 7 wherein the other of said conductive members is made of steel and is plated with a precious metal.

9. The switch assembly of claim 1 wherein said actuator is plated with a precious metal.

10. The switch assembly of claim 1 wherein said conductive members are substantially circular in plan view, and one of said conductive members has a smaller diameter than the other of said conductive members.

11. A thermal switch assembly comprising:
    a current-carrying actuator made from a shape memory alloy, said actuator being generally E-shaped in plan view and comprising a plurality of legs, at least one of said plurality of legs comprising a peripheral portion and at least another of said plurality of legs comprising a contact portion;
    first and second conductive members oriented in a spaced-apart relationship;
    said peripheral portion of said actuator being electrically isolated from one of said first and second conductive members;
    said actuator having a deformed shape below a transformation temperature range wherein said contact portion is electrically isolated from the other of said first and second conductive members; and
    said actuator having a recovered shape above said transformation temperature range wherein said contact portion is electrically contacting the other of said first and second conductive members.

12. A thermal switch assembly comprising;
    an actuator made from a shape memory alloy, said actuator comprising a base portion and a plurality of leg portions extending from said base portion, at least one of said plurality of leg portions comprising a peripheral portion and one of said plurality leg portions comprising a contact portion, said contact portion having a deformed shape at a first temperature and a recovered shape at a second temperature;
    a pair of metal outer members oriented in a relationship to define a space therebetween, said actuator being disposed within said space, said peripheral portion being in electrical contact with one of said outer members;
    an insulator at least partially disposed within said space, said insulator insulating said peripheral portion from electrical contact with the other of said outer members; and
    said contact portion being in electrical contact with the other of said outer members and providing a current path between said outer members in one of said deformed shape and said recovered shape.

13. The switch assembly of claim 12 wherein said outer members have substantially planar surfaces facing inwardly toward said space.

14. The switch assembly of claim 12 further comprising a battery having a terminal that is defined by said switch assembly, said switch assembly being installed on said battery, and wherein said switch assembly provides a current path to or from said battery.

15. The switch assembly of claim 12 wherein at least one of said conductive members is made of aluminum.

16. The switch assembly of claim 15 wherein the other of said conductive members is made of steel and is plated with a precious metal.

17. The switch assembly of claim 12 wherein said actuator is plated with a precious metal.

18. The switch assembly of claim 12 wherein said conductive members are substantially circular in plan view, and one of said conductive members has a smaller diameter than the other of said conductive members.

\* \* \* \* \*